(12) United States Patent
Chung et al.

(10) Patent No.: US 11,014,612 B2
(45) Date of Patent: May 25, 2021

(54) VEHICLE FRONT STRUCTURE

(71) Applicants: HYUNDAI MOTOR COMPANY, Seoul (KR); KIA MOTORS CORPORATION, Seoul (KR)

(72) Inventors: Hee Seouk Chung, Hwaseong-si (KR); Byeong Cheon Lee, Seoul (KR); Hyun Sik Kim, Seoul (KR); Deok Hwa Hong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 27 days.

(21) Appl. No.: 16/512,717

(22) Filed: Jul. 16, 2019

(65) Prior Publication Data

US 2020/0148270 A1 May 14, 2020

(30) Foreign Application Priority Data

Nov. 14, 2018 (KR) .......................... 10-2018-0140081

(51) Int. Cl.
*B62D 25/08* (2006.01)
*B62D 21/15* (2006.01)
*B62D 27/02* (2006.01)

(52) U.S. Cl.
CPC ......... *B62D 21/155* (2013.01); *B62D 25/082* (2013.01); *B62D 25/084* (2013.01); *B62D 27/023* (2013.01)

(58) Field of Classification Search
CPC .. B62D 21/155; B62D 21/157; B62D 25/084; B62D 25/082; B62D 25/085; B62D 27/023; B60R 19/34
See application file for complete search history.

(56) References Cited

U.S. PATENT DOCUMENTS

| 7,052,076 | B2 | 5/2006 | Kim | |
|---|---|---|---|---|
| 8,919,835 | B1* | 12/2014 | Han | B62D 25/088 293/133 |
| 9,663,050 | B2 | 5/2017 | Nishida et al. | |
| 9,764,705 | B2 | 9/2017 | Murata et al. | |
| 10,526,016 | B2* | 1/2020 | Takii | B62D 21/152 |
| 10,766,543 | B2* | 9/2020 | Cha | B62D 27/023 |
| 2004/0207234 | A1 | 10/2004 | Kim | |
| 2007/0252412 | A1 | 11/2007 | Yatsuda | |
| 2013/0249245 | A1* | 9/2013 | Sekiguchi | B62D 25/082 296/187.09 |
| 2015/0232050 | A1* | 8/2015 | Yamada | B60R 19/34 296/187.1 |

(Continued)

FOREIGN PATENT DOCUMENTS

| JP | 2005-231435 A | 9/2005 |
|---|---|---|
| JP | 2014-012428 A | 1/2014 |

(Continued)

*Primary Examiner* — Gregory A Blankenship
(74) *Attorney, Agent, or Firm* — Brinks Gilson & Lione

(57) ABSTRACT

A vehicle front structure for a vehicle may include: a front side member disposed on a front of a vehicle; and a front end member coupled to a front end of the front side member. In particular, the front end member includes a main body which is coupled to the front side member to be aligned, and a lateral reinforcement portion which extends from the main body toward an outboard side of the vehicle.

9 Claims, 12 Drawing Sheets

(56) References Cited

U.S. PATENT DOCUMENTS

| | | | | |
|---|---|---|---|---|
| 2016/0121829 A1* | 5/2016 | Murata | ............... | B62D 25/08 |
| | | | | 293/133 |
| 2016/0236718 A1* | 8/2016 | Tatsuwaki | ............ | B62D 21/155 |
| 2017/0113727 A1* | 4/2017 | Nakamoto | ............. | B60R 19/34 |
| 2018/0065667 A1* | 3/2018 | Maier | ................. | B62D 21/157 |
| 2020/0047696 A1* | 2/2020 | Atsumi | ................ | B60R 19/34 |
| 2020/0148270 A1* | 5/2020 | Chung | ............... | B62D 25/082 |

FOREIGN PATENT DOCUMENTS

| | | | |
|---|---|---|---|
| JP | 2016-088113 | A | 5/2016 |
| KR | 10-2004-0089857 | A | 10/2004 |
| KR | 10-2010-0023534 | A | 3/2010 |
| KR | 10-2015-0069967 | A | 6/2015 |

* cited by examiner

VEHICLE FRONT STRUCTURE

CROSS-REFERENCE TO RELATED APPLICATION

This application claims priority to and the benefit of Korean Patent Application No. 10-2018-0140081, filed on Nov. 14, 2018, the entire contents of which are incorporated herein by reference.

FIELD

The present disclosure relates to a vehicle front structure capable of effectively supporting an external load.

BACKGROUND

The statements in this section merely provide background information related to the present disclosure and may not constitute prior art.

In general, a vehicle body includes a main frame and a subframe, and the subframe includes a front subframe connected to a lower front end of the vehicle body, and a rear subframe connected to a lower rear end of the vehicle body.

The front subframe may support an engine, a transmission, a suspension, and the like, and facilitate the transmission of a load while ensuring structural stiffness of the vehicle. In particular, the front subframe should be firmly mounted on the vehicle body, which makes it easy to ensure the basic performance of the vehicle such as crashworthiness, NVH, and R&H.

The vehicle front structure includes a pair of front side members spaced apart from each other in a width direction of the vehicle. A front end of the front subframe may be coupled to a front end of the front side member through a plurality of reinforcing members, and a front apron member, a radiator support member, and the like may be coupled to the front end of the front side member through a plurality of reinforcing members.

The front end of the front side member may support the front subframe, the front apron member, and the radiator support member in three axial directions (a longitudinal direction, a width direction, and a height direction of the vehicle), thereby supporting a load which is transmitted in the three axial directions.

However, an existing vehicle front structure has the front subframe, the front apron member, and the radiator support member which are coupled to the front end of the front side member through the plurality of reinforcing members, resulting in increased weight and material cost.

We have discovered that the front subframe, the front apron member, and the radiator support member are coupled to the plurality of reinforcing members via a flange coupling structure, and thus this structure causes weak support stiffness with respect to the front end of the front side member.

The above information described in this background section is provided to assist in understanding the background of the inventive concept, and may include any technical concept which is not considered as the prior art that is already known to those skilled in the art.

SUMMARY

An aspect of the present disclosure provides a vehicle front structure capable of stably supporting a load, which is transmitted in three axial directions, by a front end member provided at a front end of a front side member.

According to an aspect of the present disclosure, a vehicle front structure may include: a front side member disposed on a front of a vehicle; and a front end member coupled to a front end of the front side member, wherein the front end member may include a main body which is coupled to the front side member to be aligned, and a lateral reinforcement portion which extends from the main body toward an outboard side of the vehicle.

The lateral reinforcement portion may have a plurality of ribs extending along a width direction of the vehicle, and ribs of the plurality of ribs may be spaced apart from each other in a height direction of the vehicle.

The lateral reinforcement portion and the main body may be formed as a unitary one-piece structure.

The main body may have a receiving space in which the front end of the front side member is received.

The main body may have a retention protrusion which protrudes from the inner surface of the main body inwardly toward the center of the receiving space, and a front end surface of the front side member may be overlapped and joined to the retention protrusion.

The main body may have a partition by which the receiving space is divided.

The front end member may have a mounting projection on an upper surface of the lateral reinforcement portion, and a radiator support member may be overlapped and joined to the mounting projection.

The mounting projection may have a first wall which is offset from a front end of the lateral reinforcement portion toward a rear end of the lateral reinforcement portion, and a pair of second walls which are disposed on both sides of the first wall.

The front end member may have an abutting surface on a rear surface of the lateral reinforcement portion, and a lower end of a front apron member may be overlapped and joined the abutting surface.

The abutting surface may have a first contact surface extending along a width direction of the vehicle, and a second contact surface extending along a longitudinal direction of the vehicle.

The front end member may further include a plurality of support ribs connecting between a rear wall of the lateral reinforcement portion and an outer surface of the main body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
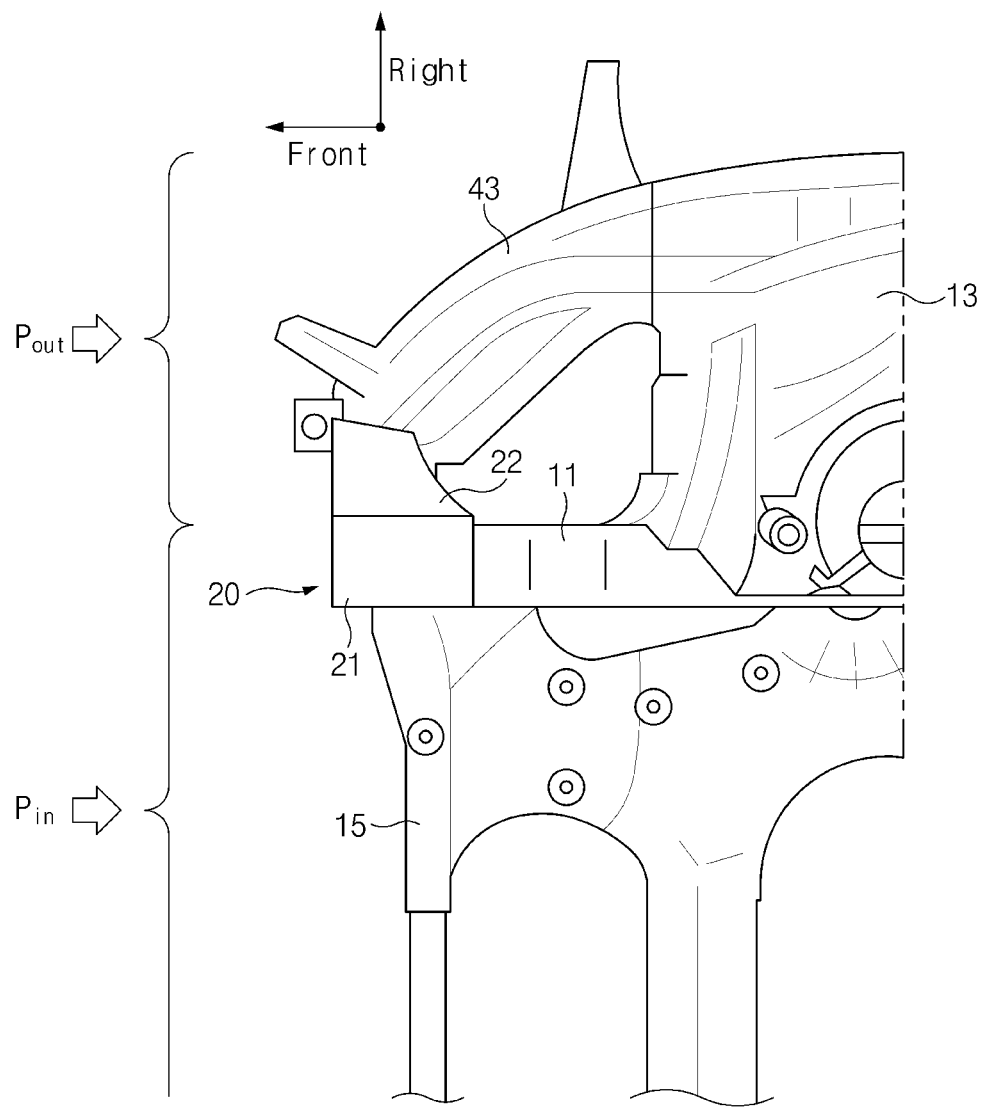
FIG. 1 illustrates a partial plan view of a vehicle front structure according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific tams, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this description, an "X-axis direction" refers to a longitudinal direction of the vehicle, a "Y-axis direction" refers to a width direction of the vehicle, and a "Z-axis direction" refers to a height direction of the vehicle. An "inboard side" refers to a portion of the vehicle facing the center of the vehicle, and an "outboard side" refers to a portion of the vehicle away from the center of the vehicle.

Figure 2:
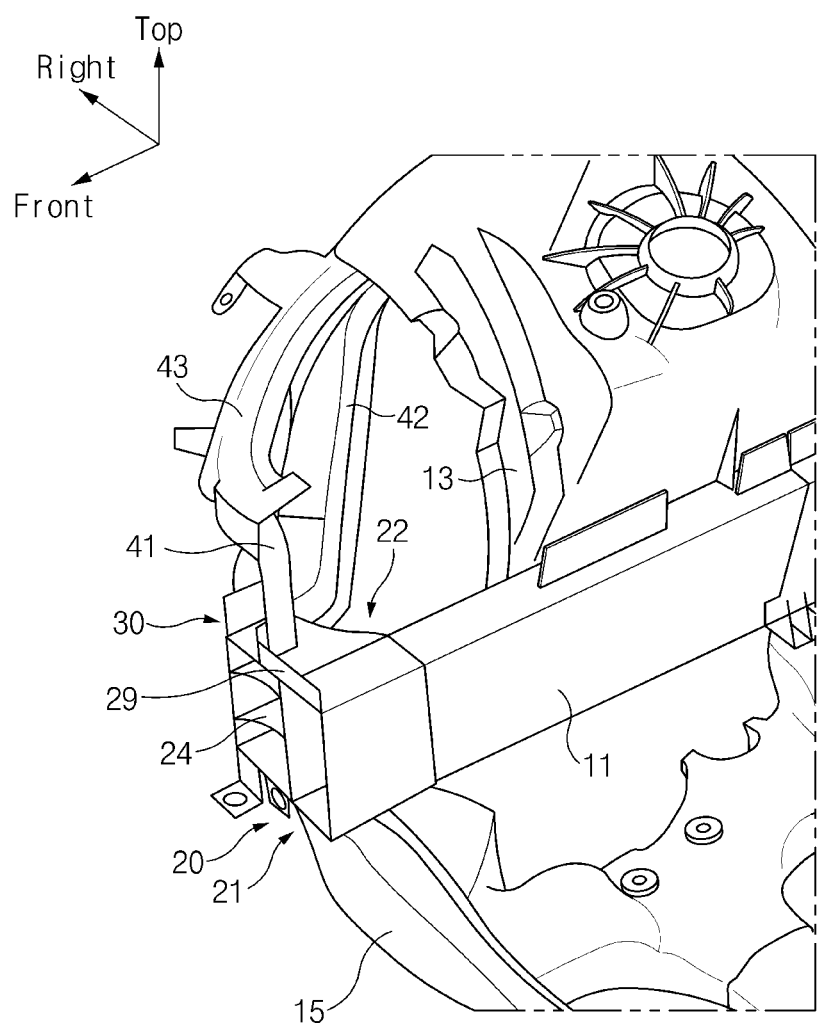
FIG. 2 illustrates a partial perspective view of a vehicle front structure according to an exemplary form of the present disclosure.

Referring to FIGS. 1 and 2, a vehicle front structure according to an exemplary form of the present disclosure may include a front side member 11 disposed on the front of the vehicle, and a front end member 20 coupled to a front end of the front side member 11.

The front side member 11 may extend along the X-axis direction (the longitudinal direction of the vehicle). The pair of front side members may be spaced apart from each other in the Y-axis direction (the width direction of the vehicle) so that they may be disposed on both left and right sides of the vehicle. For convenience of explanation, FIGS. 1 and 2 illustrate only one front side member disposed on the right side of the vehicle. A lower edge of a damper housing 13 may be coupled to an upper surface of the front side member 11.

Figure 6:
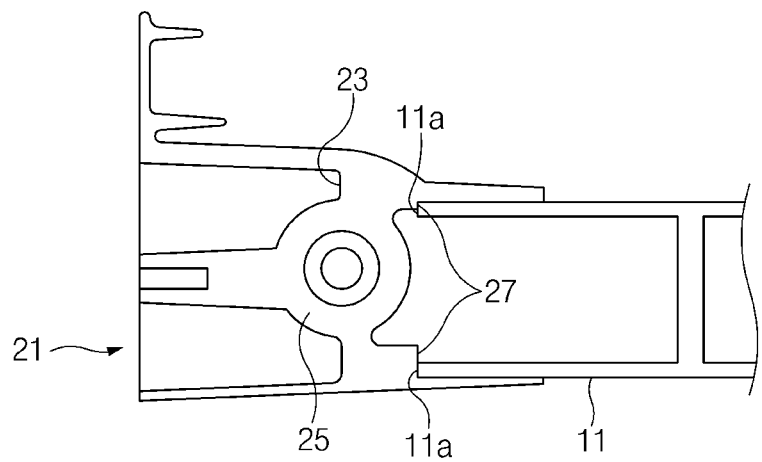
FIG. 6 illustrates a cross-sectional view taken along line B-B of FIG. 3.

Referring to FIG. 6, the front side member 11 may have a plurality of reinforcing ribs 11b, and the reinforcing ribs 11b may extend in a longitudinal direction of the front side member 11.

Figure 3:
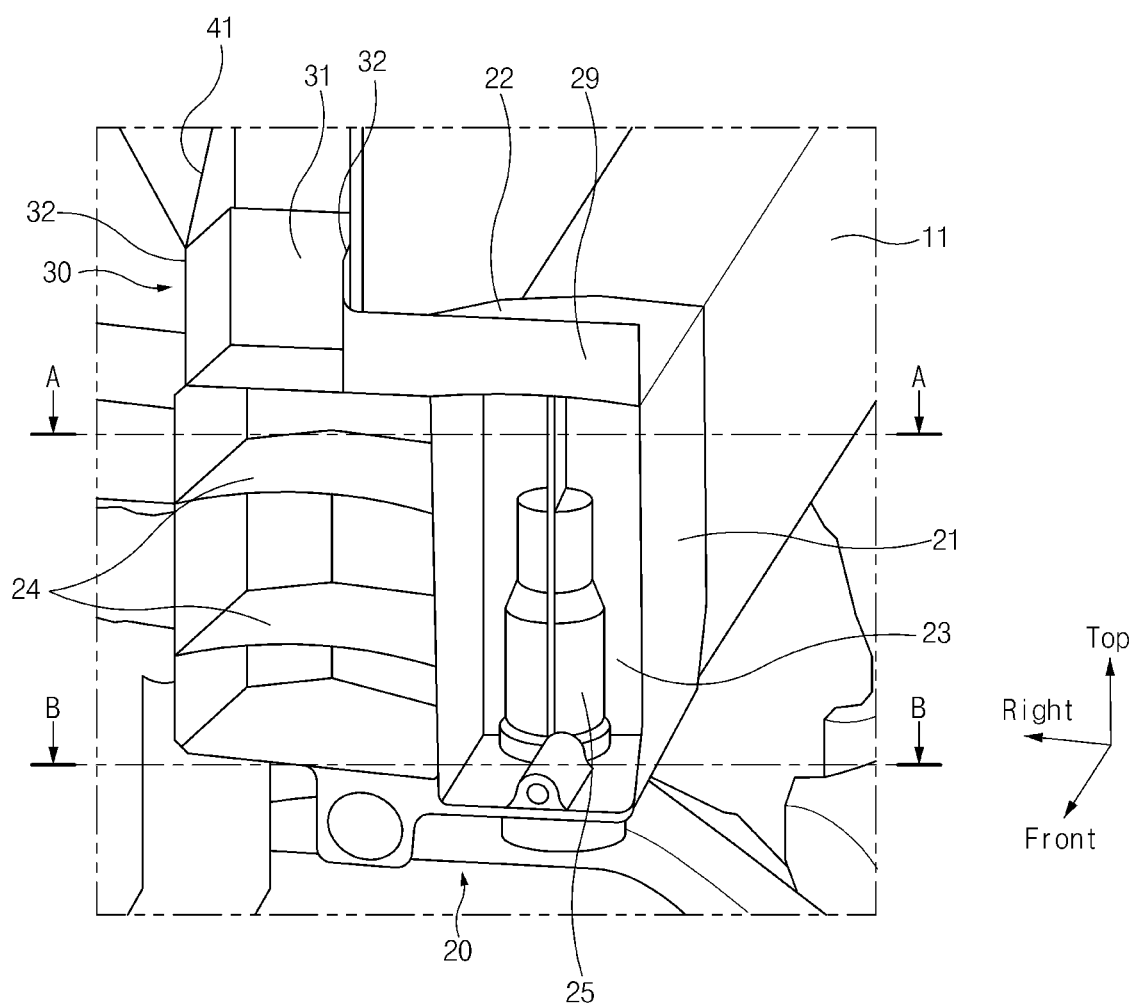
FIG. 3 illustrates a front perspective view of a front end member in a vehicle front structure according to an exemplary form of the present disclosure.

Referring to FIGS. 1 to 3, the front end member 20 may have a main body 21 and a lateral reinforcement portion 22 extending from a lateral surface of the main body 21 in the Y-axis direction (the width direction of the vehicle).

The main body 21 may have a tubular shape having an internal space. The main body 21 may have a front opening and a rear opening, and a partition 23 may be provided in the internal space of the main body 21. The lateral reinforcement portion 22 may extend toward the outboard side of the vehicle, and a flange 29 formed on a top front end of the main body 21 may extend along the Y-axis direction.

Figure 4:
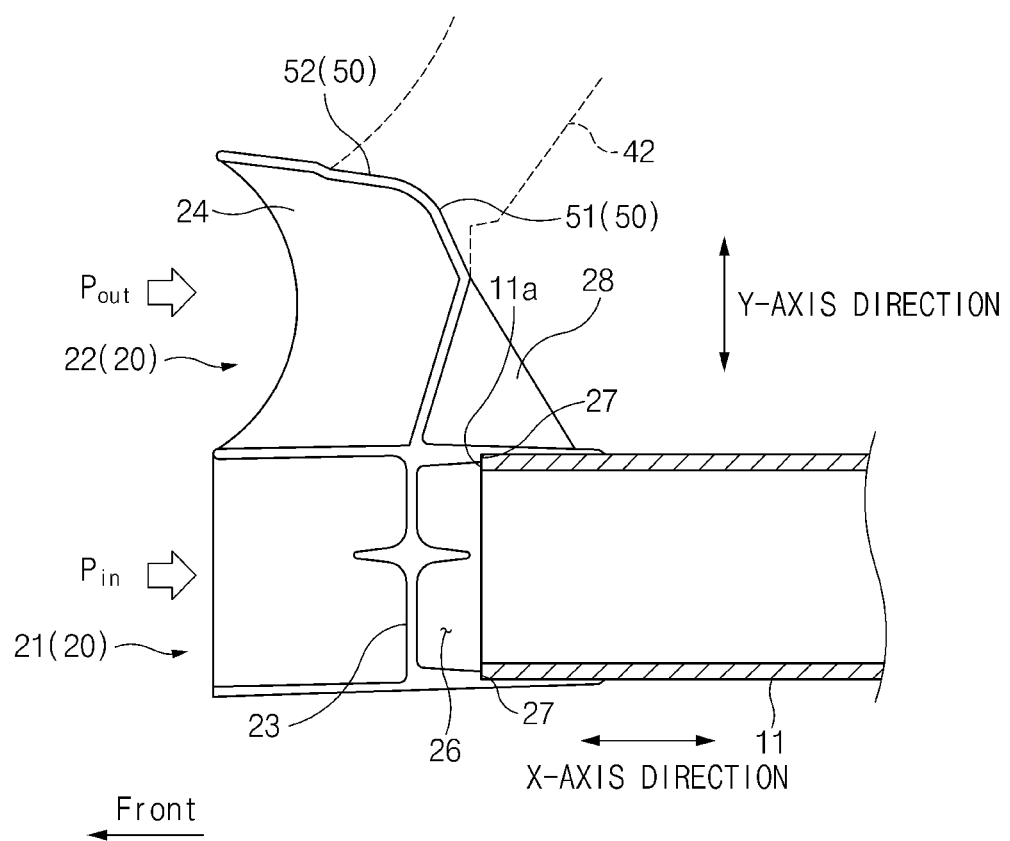
FIG. 4 illustrates a cross-sectional view taken along line A-A of FIG. 3.
Figure 5:
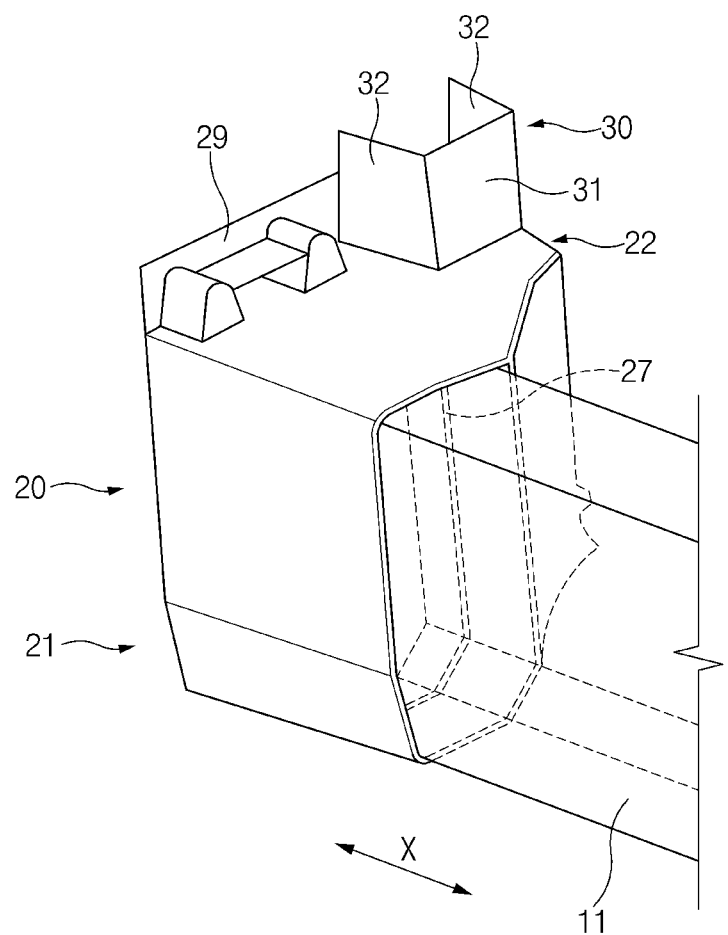
FIG. 5 illustrates a perspective view of a state in which a front side member and a front end member in a vehicle front structure according to an exemplary form of the present disclosure are coupled.

Referring to FIG. 4, the internal space of the main body 21 may be divided into a front space and a rear space by the partition 23. Referring to FIGS. 3 and 5, a fastening nut 25 may be integrally formed with the partition 23, and a fastening bolt (not shown) may be fastened into the fastening nut 25 so that a subframe 15 may be firmly connected to the partition 23 of the front end member 20.

Figure 7:
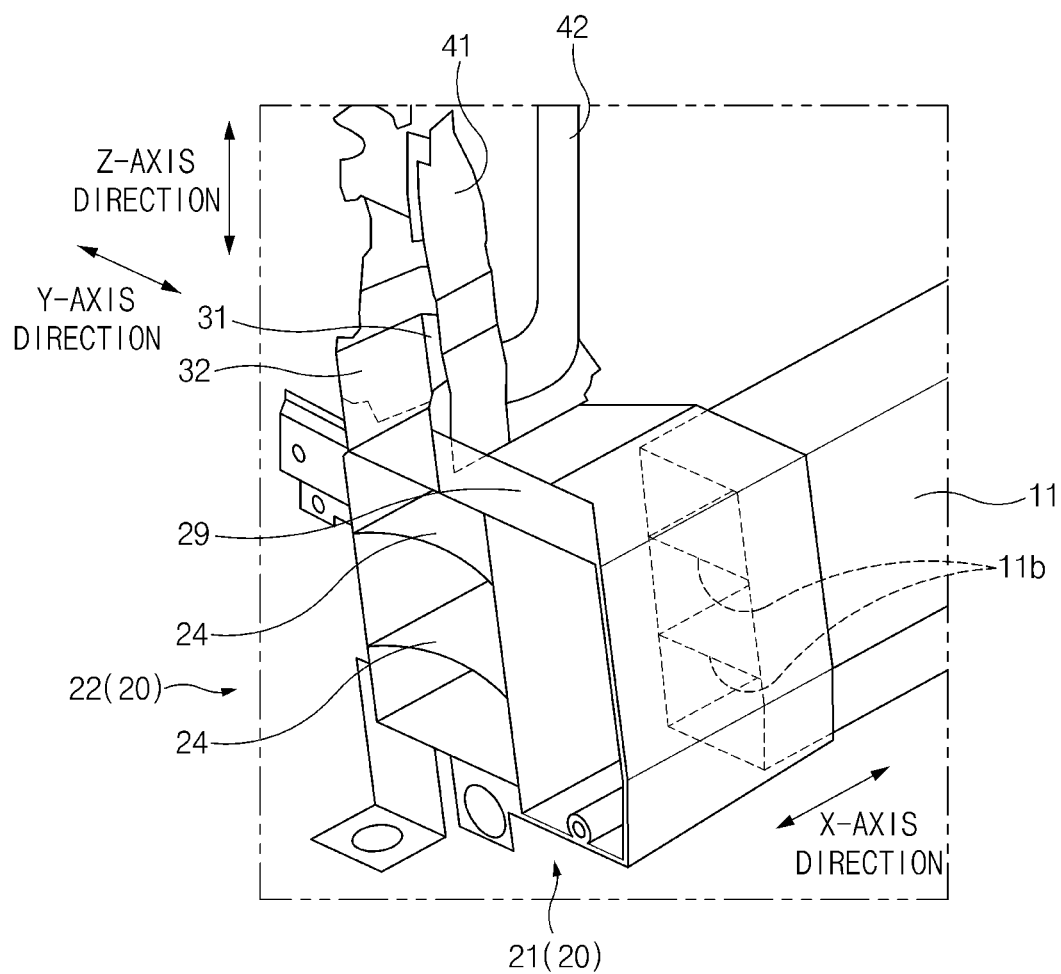
FIG. 7 illustrates a perspective view of a state in which a front side member, a front end member, a radiator support member, and a front apron member in a vehicle front structure according to an exemplary form of the present disclosure are coupled.

Referring to FIGS. 3 and 4, the lateral reinforcement portion 22 may have a plurality of ribs 24 in an internal space thereof, and each rib 24 may extend along the Y-axis direction. The plurality of ribs 24 may be spaced apart from each other in the Z-axis direction (the height direction of the vehicle). For example, as illustrated in FIGS. 3 and 7, the adjacent ribs 24 are spaced apart from each other in the height direction. The ribs 24 may connect a side wall of the lateral reinforcement portion 22 and a side wall of the main body 21. The plurality of ribs 24 may form a load path for transmitting outboard side impact energy $P_{out}$, which is transmitted from the outboard side of the vehicle on the basis of the front side member 11, to the front side member 11. Referring to FIG. 1, impact energy generated in a frontal collision of the vehicle may be divided into inboard side impact energy $P_{in}$ and the outboard side impact energy $P_{out}$ on the basis of the main body 21 and the front side member 11. The lateral reinforcement portion 22 may smoothly transmit the outboard side impact energy $P_{out}$ to the front side member 11 through the plurality of ribs 24, and the main body 21 may smoothly transmit the inboard side impact energy $P_{in}$ to the front side member 11.

According to an exemplary form, the front end member 20 may be manufactured by a high-vacuum die-casting method so that the main body 21 and the lateral reinforcement portion 22 may be formed as a unitary one-piece structure.

Referring to FIGS. 4 to 6, the front end member 20 may have a receiving space 26 in which the front end of the front side member 11 is received, and the receiving space 26 may be the rear space of the main body 21 which is divided by the partition 23. The front end of the front side member 11 may be fitted into the receiving space 26 of the front end member 20 so that the front side member 11 may be aligned with the main body 21 of the front end member 20.

Referring to FIGS. 4 and 6, the main body 21 may have a retention protrusion 27 which protrudes from the inner surface of the main body 21 inwardly toward the center of the receiving space 26, and the retention protrusion 27 may be disposed to be adjacent to the partition 23. The front side member 11 may be received in the receiving space 26, and a front end surface 11a of the front side member 11 may be overlapped and joined to the retention protrusion 27. That is, the front end surface 11a of the front side member 11 may be coupled to the retention protrusion 27 of the front end member 20 by butt welding. Thus, the front end member 20 and the front side member 11 may stably support a load transmitted in the X-axis direction so that the vehicle front structure according to the exemplary form of the present disclosure may increase or maximize stiffness with respect to the X-axis direction.

Figure 8:
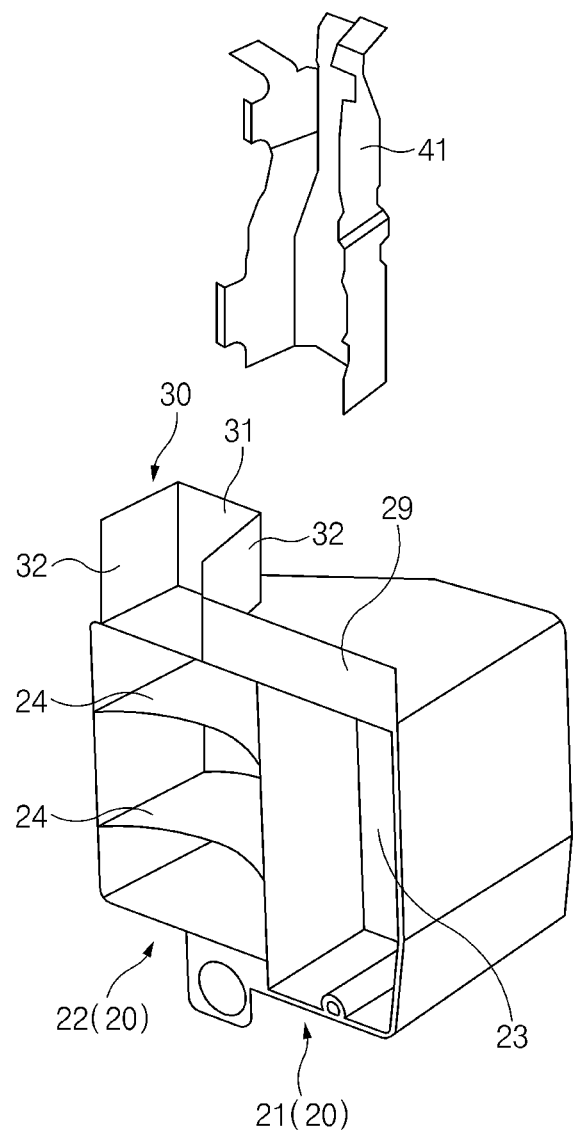
FIG. 8 illustrates an exploded perspective view of a front end member and a radiator support member in a vehicle front structure according to an exemplary form of the present disclosure.
Figure 9:
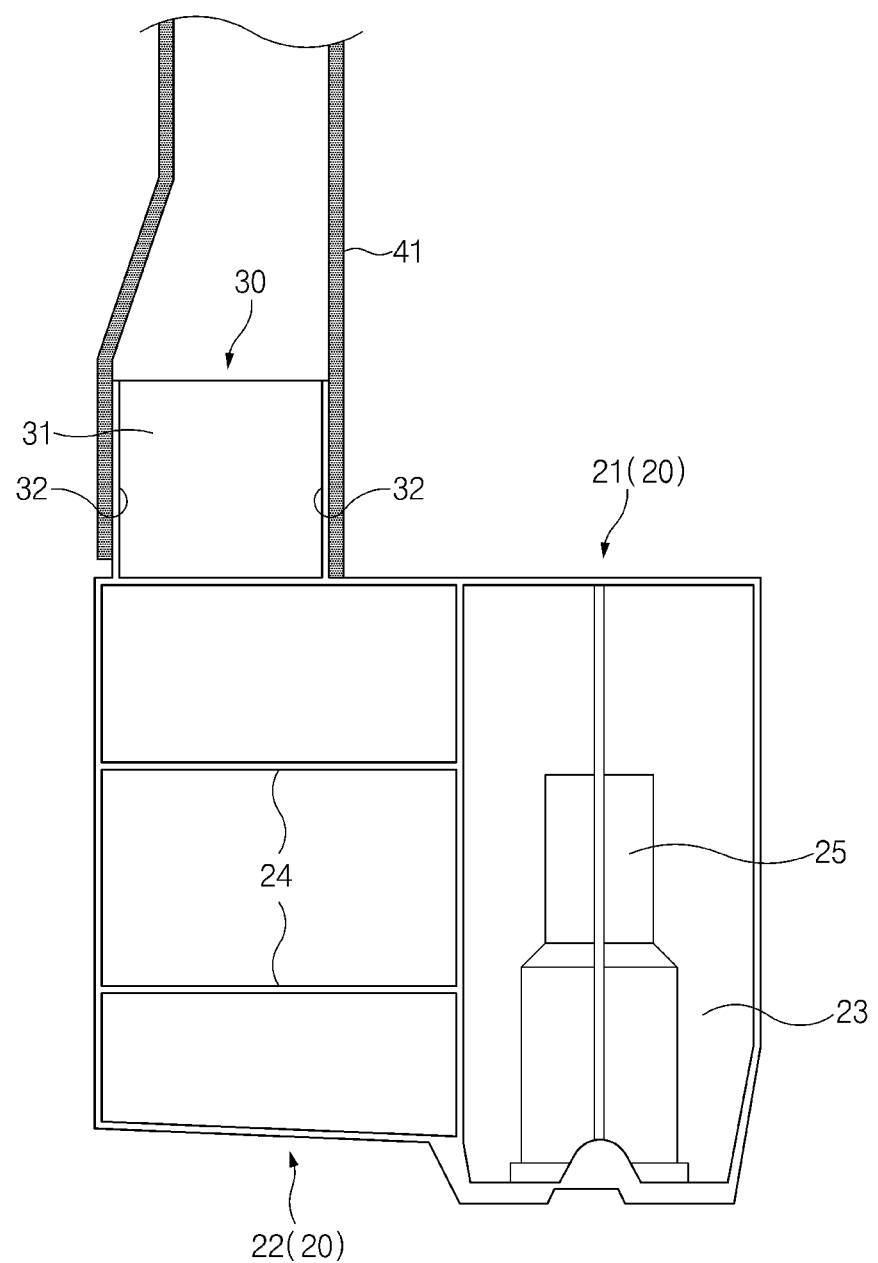
FIG. 9 illustrates a front view of a state in which a front end member and a radiator support member in a vehicle front structure according to an exemplary form of the present disclosure are coupled.

Referring to FIGS. 7 to 9, the front end member 20 may have a mounting projection 30 formed on an upper surface of the lateral reinforcement portion 22, and the mounting projection 30 may extend along the Z-axis direction (the height direction of the vehicle). The mounting projection 30 may be connected to the flange 29 of the main body 21 to provide support stiffness. The mounting projection 30 may have a first wall 31 which is offset from a front end of the lateral reinforcement portion 22 toward a rear end of the lateral reinforcement portion 22, and a pair of second walls 32 disposed on both sides of the first wall 31. The first wall 31 may extend along the Y-axis direction and the Z-axis direction to be located on a plane determined by the Y-axis and the Z-axis. The pair of second walls 32 may extend along the X-axis direction and the Z-axis direction to be located on a plane determined by the X-axis and the Z-axis. One of the second walls 32 may be integrally connected to the flange 29. A lower end of a radiator support member 41 may be overlapped and joined to the mounting projection 30 so that the radiator support member 41 and the mounting projection 30 may be coupled by butt welding. The radiator support member 41 may extend from an upper member 43 of a vehicle body main frame, and the radiator support member 41 may serve to support a radiator. The radiator support member 41 may extend along the Z-axis direction. Thus, the radiator support member 41 and the front end member 20 may stably support a load transmitted in the Z-axis direction so that the vehicle front structure according to the exemplary form of the present disclosure may increase or maximize stiffness with respect to the Z-axis direction.

Figure 10:
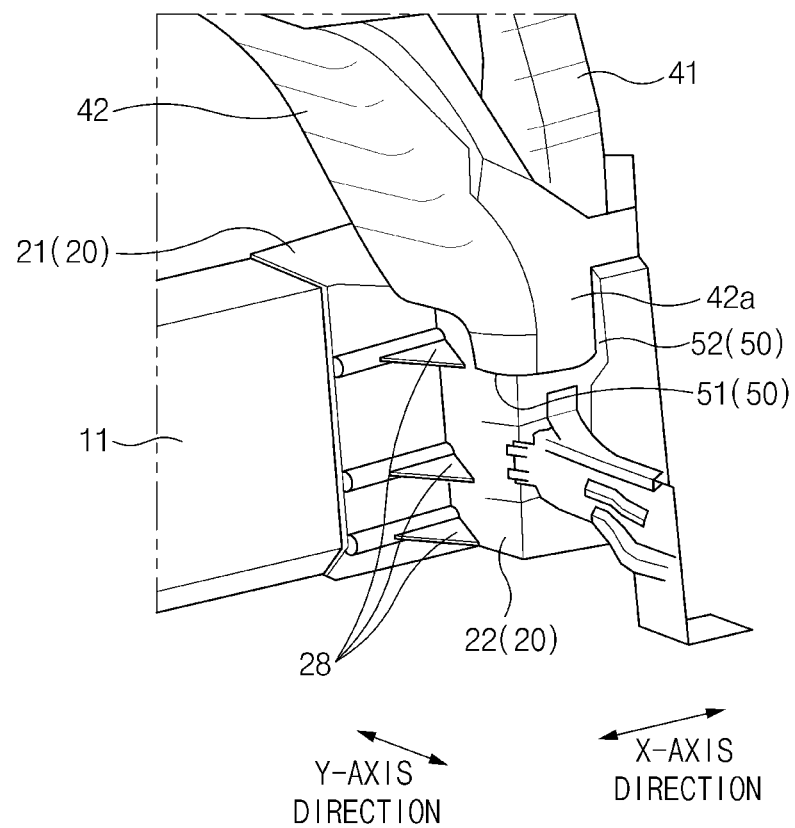
FIG. 10 illustrates a perspective view of a state in which a front end member, a front side member, and a front apron member in a vehicle front structure according to an exemplary form of the present disclosure are coupled.
Figure 11:
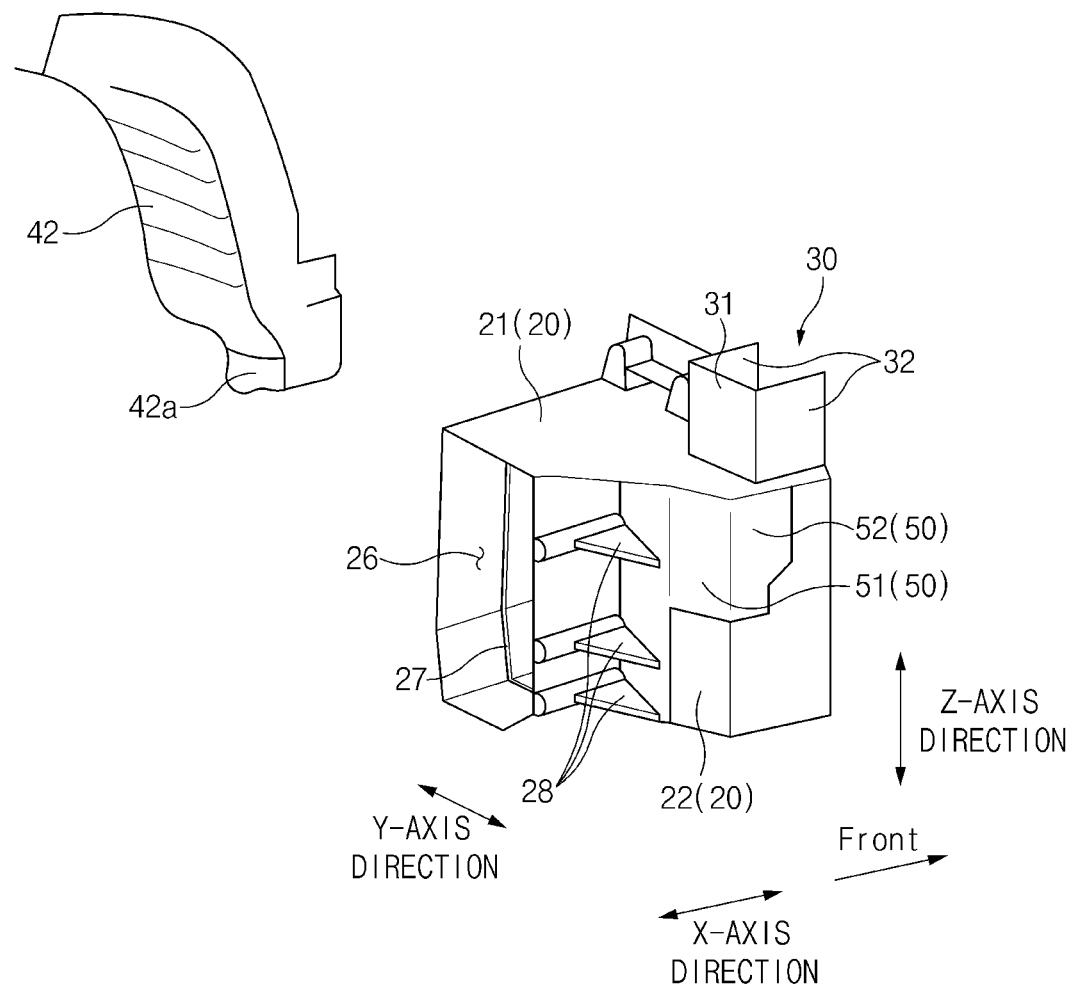
FIG. 11 illustrates an exploded perspective view of a front end member and a front apron member in a vehicle front structure according to an exemplary form of the present disclosure.
Figure 12:
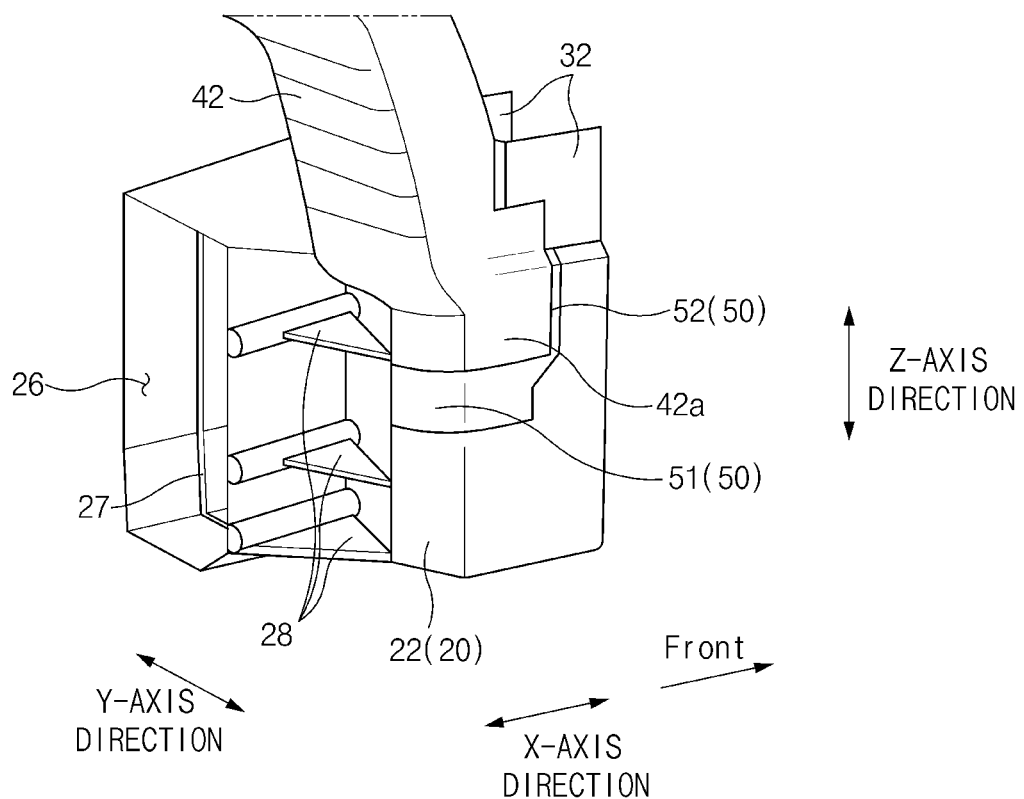
FIG. 12 illustrates a perspective view of a state in which a front end member and a front apron member in a vehicle front structure according to an exemplary form of the present disclosure are coupled.

Referring to FIGS. 10 to 12, the front end member 20 may have an abutting surface 50 formed on a rear surface of the lateral reinforcement portion 22, and a lower end 42a of a front apron member 42 may be overlapped and joined the abutting surface 50 of the front end member 20 by butt welding. The abutting surface 50 may have a first contact surface 51 and a second contact surface 52, and the first contact surface 51 and the second contact surface 52 may intersect at a predetermined angle. The first contact surface 51 may extend along the Z-axis direction and the Y-axis direction to be located on a plane determined by the Z-axis and the Y-axis, and the second contact surface 52 may extend along the Z-axis direction and the X-axis direction to be located on a plane determined by the Z-axis and the X-axis. According to an exemplary form, the first contact surface 51 may intersect with the Y-axis direction at a predetermined angle, and the second contact surface 52 may intersect with the X-axis direction at a predetermined angle.

The lower end 42a of the front apron member 42 may have a structure corresponding to the first contact surface 51 and the second contact surface 52 of the abutting surface 50. The lower end 42a of the front apron member 42 may have a portion extending along the Y-axis direction and a portion extending along the X-axis direction. Thus, the front apron member 42 and the front end member 20 may stably support a load transmitted in the Y-axis direction and the X-axis direction so that the vehicle front structure according to the exemplary form of the present disclosure may increase or maximize stiffness with respect to the Y-axis direction and the X-axis direction.

In addition, a plurality of support ribs 28 may connect between a rear wall of the lateral reinforcement portion 22 and an outer surface of the main body 21. Each support rib 28 may extend from the rear wall of the lateral reinforcement portion 22 to the outer surface of the main body 21, and may have a triangular structure. The lower end 42a of the front apron member 42 may be coupled to the abutting surface 50 of the lateral reinforcement portion 22 by butt welding so that support stiffness of the lateral reinforcement portion 22 may be secured by the plurality of support ribs 28.

According to exemplary forms of the present disclosure, the front side member 11 may be coupled to the main body 21 of the front end member 20 by butt welding or the like to be aligned, thereby improving stiffness with respect to the X-axis direction (the longitudinal direction of the vehicle); the radiator support member 41 may be coupled to the mounting projection 30 of the front end member 20 by butt welding or the like, thereby improving stiffness with respect to the Z-axis direction (the height direction of the vehicle); and the front apron member 42 may be coupled to the rear surface of the front end member 20 by butt welding or the like, thereby improving stiffness with respect to the Y-axis direction (the width direction of the vehicle). In other words, the vehicle front structure according to the exemplary forms of the present disclosure may improve stiffness with respect to the three axial directions using the front end member 20, thereby reducing the running noise of the vehicle.

In addition, the front side member 11 may be coupled to the main body 21, and the radiator support member 41 and the front apron member 42 may be coupled to the lateral reinforcement portion 22, so that the impact energy generated in the frontal collision of the vehicle may be dispersed into the inboard side impact energy $P_{in}$ and the outboard side impact energy $P_{out}$ on the basis of the main body 21 and the front side member 11. In particular, the lateral reinforcement portion 22 may smoothly transmit the outboard side impact energy $P_{out}$ to the front side member 11 through the plurality of ribs 24, and the main body 21 may smoothly transmit the inboard side impact energy $P_{in}$ to the front side member 11.

As set forth above, the vehicle front structure according to exemplary forms of the present disclosure may improve stiffness with respect to the X-axis direction (the longitudinal direction of the vehicle) by coupling the front side member to the main body of the front end member by butt welding or the like to be aligned, improve stiffness with respect to the Z-axis direction (the height direction of the vehicle) by coupling the radiator support member to the mounting projection of the front end member by butt welding or the like, and improve stiffness with respect to the Y-axis direction (the width direction of the vehicle) by coupling the front apron member to the rear surface of the front end member by butt welding or the like. In other words, the vehicle front structure according to the exemplary forms of the present disclosure may improve stiffness with respect to the three axial directions using the front end member, thereby reducing running noise of the vehicle.

According to exemplary forms of the present disclosure, the front side member may be coupled to the main body, and the radiator support member and the front apron member may be coupled to the lateral reinforcement portion, so that impact energy generated in the frontal collision of the vehicle may be dispersed into the inboard side impact energy $P_{in}$ and the outboard side impact energy $P_{out}$. In particular, the lateral reinforcement portion may smoothly transmit the outboard side impact energy $P_{out}$ to the front side member through the plurality of ribs, and the main body may smoothly transmit the inboard side impact energy $P_{in}$ to the front side member.

According to exemplary forms of the present disclosure, the main body and the lateral reinforcement portion of the front end member may be formed as a unitary one-piece structure, thereby significantly reducing the manufacturing cost and weight.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle front structure, comprising:
   a front side member disposed on a front of a vehicle; and
   a front end member coupled to a front end of the front side member,
   wherein the front end member includes:
      a main body coupled to the front side member to be aligned, and
      a lateral reinforcement portion extending from the main body toward an outboard side of the vehicle,
   wherein the main body includes:
      a receiving space in which the front end of the front side member is received,
      a retention protrusion which protrudes from an inner surface of the main body toward a center of the receiving space, and
      a front end surface of the front side member overlapped and joined to the retention protrusion.

2. The vehicle front structure according to claim 1, wherein the lateral reinforcement portion has a plurality of ribs extending along a width direction of the vehicle, and
   wherein ribs of the plurality of ribs are spaced apart from each other in a height direction of the vehicle.

3. The vehicle front structure according to claim 1, wherein the lateral reinforcement portion and the main body are formed as a unitary one-piece structure.

4. The vehicle front structure according to claim 1, wherein the main body has a partition configured to divide the receiving space.

5. The vehicle front structure according to claim 1, wherein the front end member has a mounting projection on an upper surface of the lateral reinforcement portion, and
   a radiator support member overlapped and joined to the mounting projection.

6. The vehicle front structure according to claim 5, wherein the mounting projection has a first wall which is offset from a front end of the lateral reinforcement portion toward a rear end of the lateral reinforcement portion, and a pair of second walls which are disposed on both sides of the first wall.

7. The vehicle front structure according to claim 1, wherein the front end member has an abutting surface on a rear surface of the lateral reinforcement portion, and
   a lower end of a front apron member overlapped and joined to the abutting surface.

8. The vehicle front structure according to claim 7, wherein the abutting surface has a first contact surface extending along a width direction of the vehicle, and a second contact surface extending along a longitudinal direction of the vehicle.

9. The vehicle front structure according to claim 1, wherein the front end member further includes a plurality of support ribs connecting between a rear wall of the lateral reinforcement portion and an outer surface of the main body.

* * * * *